US009706291B1

(12) United States Patent
Oswald et al.

(10) Patent No.: US 9,706,291 B1
(45) Date of Patent: *Jul. 11, 2017

(54) VEHICLE HEADRESTS

(71) Applicant: Bose Corporation, Framingham, MA (US)

(72) Inventors: Charles Oswald, Arlington, MA (US); Matthew Carlos Baron, Cambridge, MA (US); Daniel Ross Tengelsen, Framingham, MA (US); Bradford Kyle Subat, Northborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,768

(22) Filed: Apr. 4, 2016

(51) Int. Cl.
H04R 1/02 (2006.01)
H04R 1/34 (2006.01)
H04R 1/24 (2006.01)
H04R 1/28 (2006.01)
B60N 2/48 (2006.01)

(52) U.S. Cl.
CPC .......... *H04R 1/345* (2013.01); *B60N 2/4876* (2013.01); *H04R 1/025* (2013.01); *H04R 1/24* (2013.01); *H04R 1/288* (2013.01); *H04R 2499/13* (2013.01)

(58) Field of Classification Search
CPC combination set(s) only.
See application file for complete search history.

(56) References Cited

U.S. PATENT DOCUMENTS

| 7,748,495 | B2 * | 7/2010 | Krueger | H04R 1/2857 |
| | | | | 181/144 |
| 8,351,630 | B2 | 1/2013 | Ickler et al. | |
| 8,358,798 | B2 | 1/2013 | Ickler et al. | |
| 8,447,055 | B2 * | 5/2013 | Jankovsky | H04R 1/345 |
| | | | | 381/337 |
| 2003/0152245 | A1 * | 8/2003 | Maekawa | B60N 2/68 |
| | | | | 381/388 |
| 2009/0274329 | A1 * | 11/2009 | Ickler | H04R 1/345 |
| | | | | 381/338 |
| 2015/0201260 | A1 * | 7/2015 | Oswald | H04R 1/025 |
| | | | | 381/86 |
| 2016/0039320 | A1 * | 2/2016 | Subat | B60N 2/4876 |
| | | | | 297/217.5 |

* cited by examiner

Primary Examiner — Disler Paul
(74) Attorney, Agent, or Firm — Bose Corporation

(57) ABSTRACT

A vehicle headrest includes a passive directional acoustic device. The passive directional acoustic device includes an acoustic driver, a pipe acoustically coupled to the acoustic driver. The pipe includes an elongated opening along at least a portion of the length of the pipe through which acoustic energy is radiated to the environment. The radiation is characterized by a volume velocity. The pipe and the opening are configured so that the magnitude of the volume velocity is substantially constant along the length of the pipe.

30 Claims, 6 Drawing Sheets

VEHICLE HEADRESTS

BACKGROUND

This disclosure relates to vehicle headrests, and, more particularly, to vehicle headrests which include passive directional acoustic devices.

SUMMARY

All examples and features mentioned below can be combined in any technically possible way.

In one aspect, a vehicle headrest includes a first passive directional acoustic device. The first passive directional acoustic device includes a first acoustic driver, and a first pipe acoustically coupled to the first acoustic driver. The first pipe includes an elongated opening along at least a portion of the length of the first pipe through which acoustic energy is radiated to the environment. The radiation is characterized by a volume velocity. The first pipe and the opening are configured so that the magnitude of the volume velocity is substantially constant along the length of the first pipe.

Implementations may include one of the following features, or any combination thereof.

In some implementations, a support rod for coupling the headrest to a seatback, and the first passive directional acoustic device is coupled to the support rod.

In certain implementations, the vehicle headrest includes a first acoustic sub-assembly. The first acoustic sub-assembly includes the first passive directional acoustic device, and a second passive directional acoustic device. The second passive directional acoustic device includes a second acoustic driver, and a second pipe acoustically coupled to the second acoustic driver. The second pipe includes an elongated opening along at least a portion of the length of the second pipe through which acoustic energy is radiated to the environment. The radiation is characterized by a volume velocity. The second pipe and the opening are configured so that the magnitude of the volume velocity is substantially constant along the length of the second pipe. The second pipe is substantially parallel with the first pipe for arraying acoustic output of the first and second pipes.

In some embodiments, the second passive directional acoustic device is directly coupled to the first passive directional acoustic device.

In certain embodiments, the first acoustic sub assembly also includes a third acoustic driver and a first acoustic enclosure for supporting the third acoustic driver.

In some cases, the first and second acoustic drivers are high frequency drivers, and the third acoustic driver is a mid-high frequency driver.

In certain cases, the first pipe, the second pipe, and the first acoustic enclosure are at least partially integrally formed.

In some examples, the first acoustic sub assembly also includes a fourth acoustic driver and a second acoustic enclosure for supporting the fourth acoustic driver. The third acoustic driver and the fourth acoustic driver are configured to be driven in an acoustic array.

In certain examples, the first and second acoustic drivers are high frequency drivers, and the third and fourth acoustic drivers are mid-high frequency drivers.

In some implementations, the first pipe, the second pipe, the first acoustic enclosure, and the second acoustic enclosure are at least partially integrally formed.

In certain implementations, the vehicle headrest also includes a second acoustic sub-assembly that is a mirror image of the first acoustic sub-assembly.

In some embodiments, the first pipe is curved such that the first acoustic driver is positioned inwardly toward the core and away from an outer surface of the headrest.

In certain embodiments, a portion of the first elongated opening is covered with an acoustic absorbing material.

In some cases, the first pipe is configured such that the magnitude of the pressure along the first pipe is substantially constant.

In certain cases, the cross-sectional area of the first pipe decreases with distance from the first acoustic driver.

In some examples, the vehicle headrest also includes acoustically resistive material in or on the first opening.

In certain examples, the resistance of the acoustically resistive material varies along the length of the first pipe.

In some implementations, the acoustically resistive material is selected from the group consisting of: wire mesh, sintered plastic, fabric, and combinations thereof.

In certain implementations, the first pipe and the first opening are configured and dimensioned and the resistance of the resistive material is selected so that substantially all of the acoustic energy radiated by the acoustic driver is radiated through the first opening before the acoustic energy reaches the end of the first pipe.

In some embodiments, the first opening has more than one section.

In certain embodiments, the first opening is curved and is on a curved surface of the first pipe.

In another aspect, a vehicle headrest includes a first acoustic sub-assembly. The first acoustic sub-assembly includes a pair of passive directional acoustic devices. Each of the passive directional acoustic devices includes a high frequency acoustic driver; and a pipe acoustically coupled to the high frequency acoustic driver. Each pipe includes an elongated opening along at least a portion of the length of the pipe through which acoustic energy is radiated to the environment. The radiation is characterized by a volume velocity. The pipe and the opening configured so that the magnitude of the volume velocity is substantially constant along the length of the pipe.

Implementations may include one of the above and/or below features, or any combination thereof.

In some embodiments, the first acoustic sub-assembly also includes a pair of mid-high frequency drivers and a pair of acoustic enclosures supporting respective ones of the mid-high frequency drivers.

In some implementations, the vehicle headrest also includes a second acoustic sub-assembly. The first and second acoustic sub-assemblies may be substantially mirror images of each other.

In certain implementations, the pipes are curved such that the high frequency acoustic drivers are positioned inwardly toward the core and away from an outer surface of the headrest.

In some embodiments, the openings have a curvature which conforms to a curvature of the pipes.

In certain embodiments, respective portions of the openings are covered with an acoustic absorbing material (e.g., acoustic absorption foam).

In some cases, the vehicle headrest also includes acoustically resistive material in or on the elongated openings.

In certain cases, the resistance of the acoustically resistive material varies along the length of the pipes.

In some examples, the acoustically resistive material is selected from the group consisting of: wire mesh, sintered plastic, fabric, and combinations thereof.

In certain examples, the pipes and the openings are configured and dimensioned and the resistance of the resistive material is selected so that substantially all of the acoustic energy radiated by the acoustic drivers is radiated through the openings before the acoustic energy reaches the end of the corresponding one of the pipes.

In some implementations, the headrest includes a support rod for coupling the headrest to a seatback, and the passive directional acoustic devices are coupled to the support rod.

DETAILED DESCRIPTION

Figure 1A:
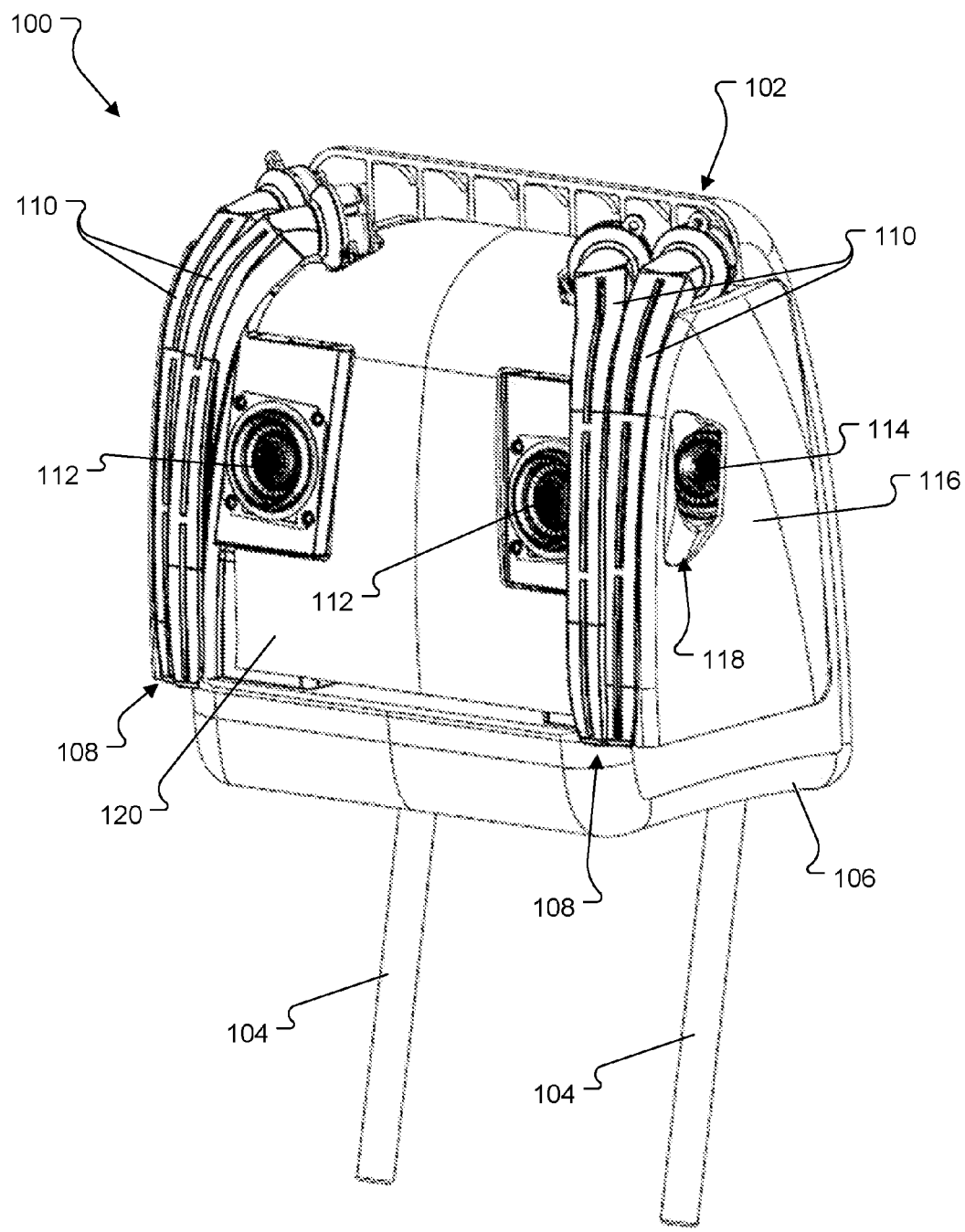
FIG. 1A is a perspective view of a vehicle headrest as seen from the front, top, and left side.
Figure 1B:
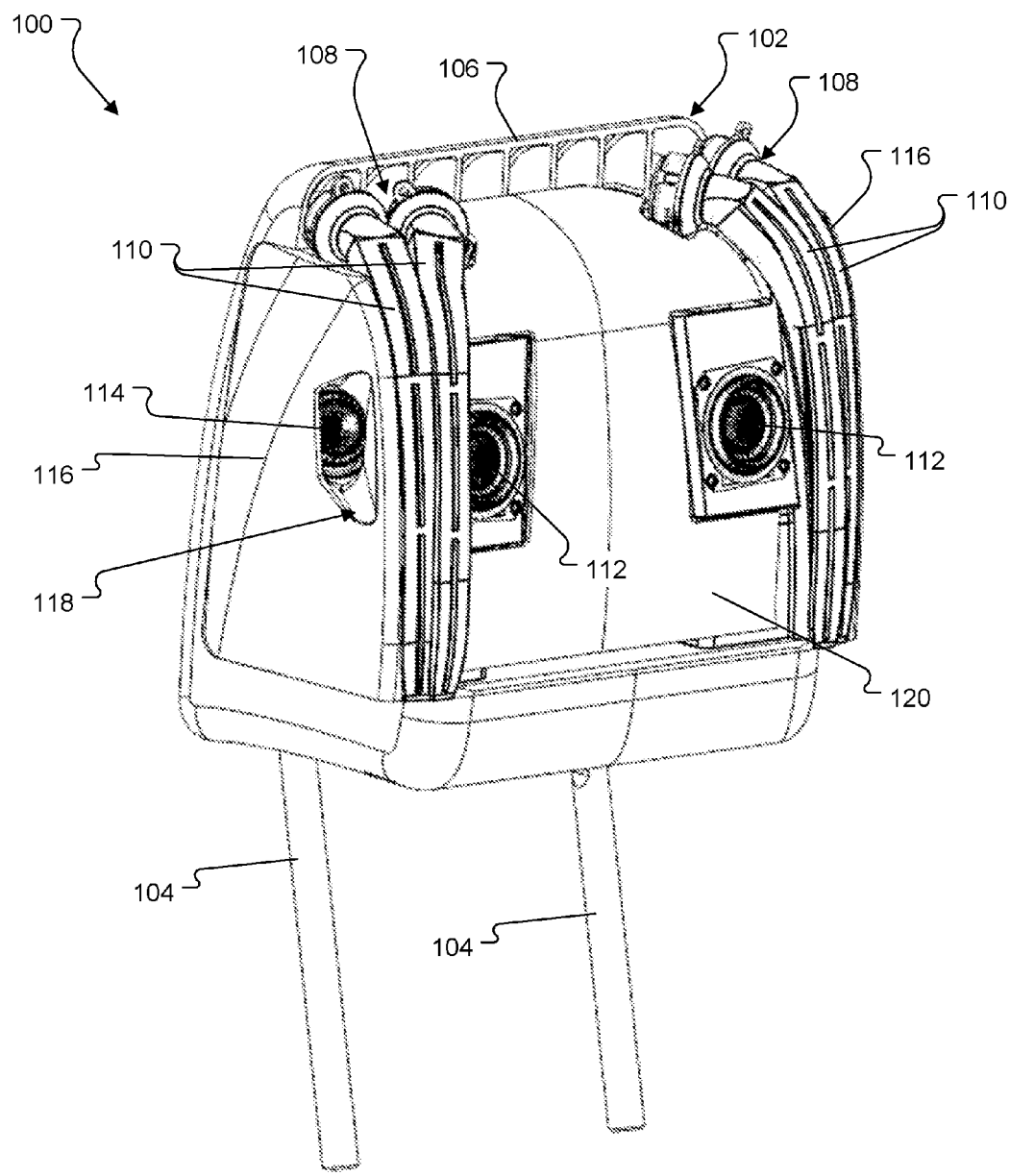
FIG. 1B is a perspective view of the vehicle headrest of FIG. 1A as seen from the front, top, and right side.

Referring to FIGS. 1A and 1B, an exemplary vehicle headrest 100 includes a main body portion 102 for supporting the back of a user's head; and one or more (two shown) support rods 104 for detachably mounting the headrest 100 to a seat back.

The main body portion 102 includes a core assembly, which houses a plurality of acoustic drivers. The core assembly includes a core 106 and a pair of acoustic sub-assemblies 108, which are coupled to the core 106. The core 106 is coupled to the support rods 104. The core 106 is the main structural member of the assembly. The core 106 may be formed from rigid plastic or metal.

The acoustic sub-assemblies 108 are substantially mirror images of each other. Each of the acoustic sub-assemblies 108 includes a pair of passive directional acoustic devices 110 for providing high frequency acoustic output, and a pair of mid-high frequency acoustic drivers for providing mid-to-high frequency acoustic output. The high frequency acoustic output can be in the 2 kHz to 20 kHz frequency range, whereas the mid-to-high frequency acoustic can be in the 200 Hz to 8 kHz frequency range. Exemplary passive directional acoustic devices are described in U.S. Pat. No. 8,351,630, which issued on Jan. 8, 2013, and U.S. Pat. No. 8,447,055, which issued on May 21, 2013, the complete disclosures of which are incorporated herein by referenced in their entirety.

The mid-high frequency acoustic drivers 112, 114 include a pair of forward firing acoustic drivers 112 (one in each sub-assembly) which are arranged to direct acoustic energy through the front surface of the headrest 100; and a pair of side firing drivers 114 (also one in each sub-assembly), which are arranged to direct acoustic energy through respective side surfaces of the headrest 100.

The headrest 100 also includes a pair of end caps 116 which are arranged along respective side surfaces of the headrest 100 and are coupled to the core 106 and/or the acoustic sub-assemblies 108. Each of the end caps 116 includes an acoustic channel 118 that is shaped to direct acoustic energy from an associated one of the side firing acoustic drivers 114 toward the front of the headrest 100. The acoustic channels 118 generally serve two purposes, the first is to increase the directivity toward the expected position of the user's head. The other purpose of the acoustic channels 118 is to place the exit of the acoustic channel 118 as close as possible to an associated one of the forward firing acoustic drivers 112 for arraying purposes. Additional details regarding how the acoustic channels may be formed can be found in U.S. patent application Ser. No. 14/154,924, filed Jan. 14, 2014, the entire disclosure of which is incorporated herein by reference.

The core assembly also includes a reaction plate 120 which extends between the forward firing acoustic drivers. The reaction plate 120 is configured to support a user's head and minimize hyper rotation of the user's head and neck (e.g., whiplash) in the event of relatively sudden vehicle acceleration, for example as might occur in the case of a rear-end collision. The reaction plate 120 may be formed of a rigid material such as plastic or metal, and may be coupled to the core 106 and/or the acoustic sub-assemblies 108.

Figure 2A:
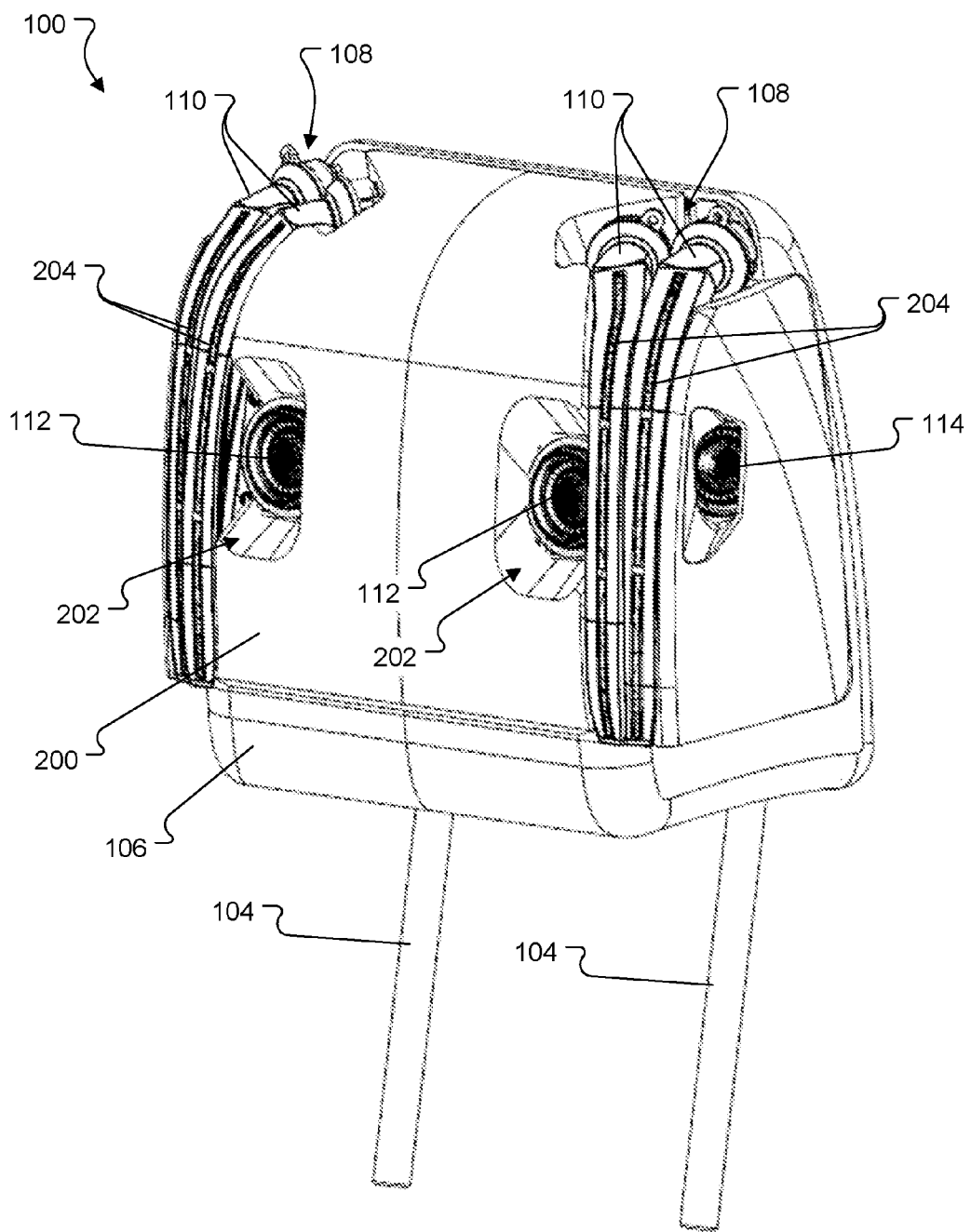
FIG. 2A is a perspective view of the vehicle headrest of FIG. 1A, as seen from the front, top, and left side, shown with a cushion layer.

Referring to FIG. 2A, a cushion layer 200 is provided over the reaction plate 120 (FIGS. 1A & 1B). As the name suggests, the cushion layer 200 provides a soft cushioned surface for a user's head to rest against. The cushion layer 200 includes a pair of acoustic channels 202 for the forward firing acoustic drivers 112, which can help to allow acoustic energy from the forward firing drivers 112 to pass through the front surface 203 (FIG. 2B) of the headrest 100 (i.e., the surface against which the back of a user's head typically rests during normal use) and can also help to direct the acoustic energy. The cushion layer 200 may be formed from an acoustically isolating foam material and the acoustic channels 202 may be integrally formed therein.

Figure 2B:
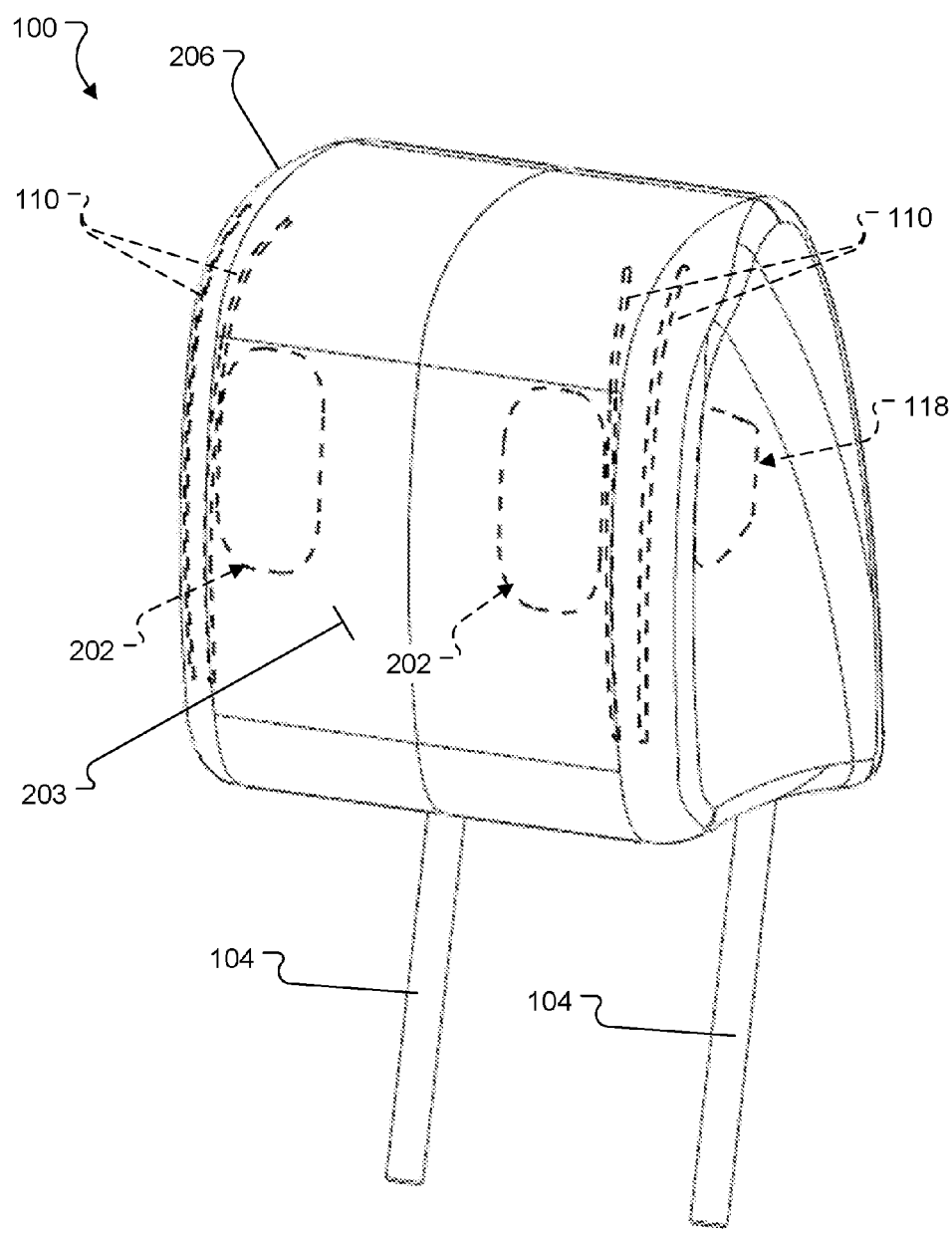
FIG. 2B is a perspective view of the vehicle headrest of FIG. 2A shown with a cover layer.

As shown in FIG. 2B, the core assembly is enveloped with a cover layer 206. In the completed assembly, the acoustic channels 118, 202 and the passive directional acoustic devices 110 are entirely enclosed within the main body portion 102. The cover layer 206 can, for example, be a type of fabric capable of being drawn around the core assembly.

In operation, each acoustic sub-assembly 108 provides a pair of directional arrays. In that regard, the forward firing and side firing mid-high frequency drivers 112, 114 of each sub-assembly 108 are driven to provide a first, mid-high frequency directional array, and each pair of passive directional acoustic devices 110 is driven to provide a corresponding second, high frequency directional array. Each array is driven by audio signals to radiate greater acoustic energy corresponding to the audio signals to an expected position of the head of a user at a seat position associated with the headrest 100 than to the expected position of the head of any other vehicle occupant at any other seating location in the vehicle.

This configuration can be particularly advantageous for audio systems that implement isolated listening zones, such as those described in U.S. patent application Ser. No. 14/828,991, filed Aug. 18, 2015, due to the increased directivity of acoustic energy toward the region forward of the front surface of the headrest 100 (i.e., where a user's head would typically be positioned during normal use). The complete disclosure of U.S. patent application Ser. No. 14/828,991 is incorporated herein by referenced in its entirety.

Figure 3:
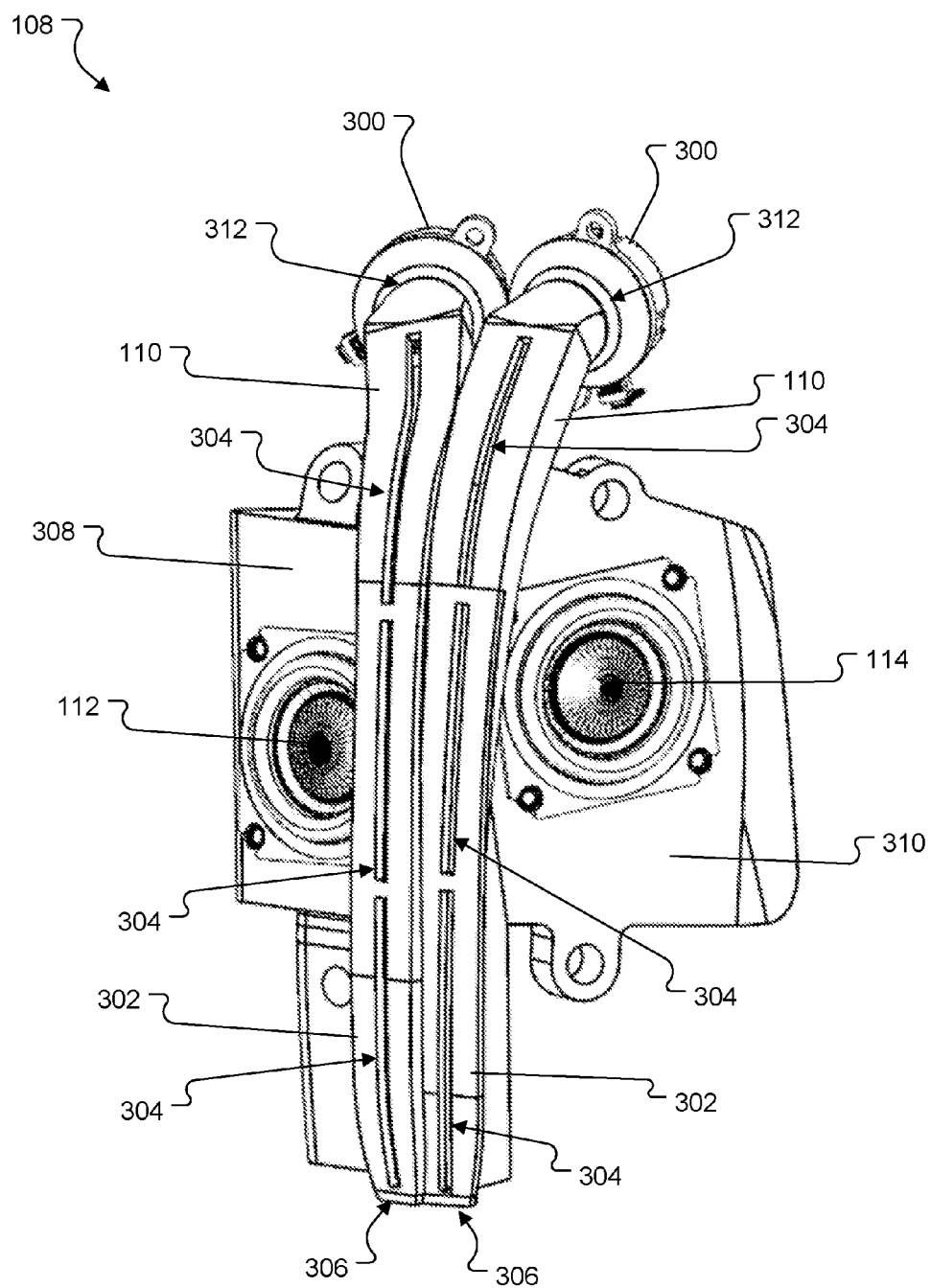
FIG. 3 is a perspective view of an acoustic sub-assembly from the vehicle headrest of FIG. 1A.
Figure 4:
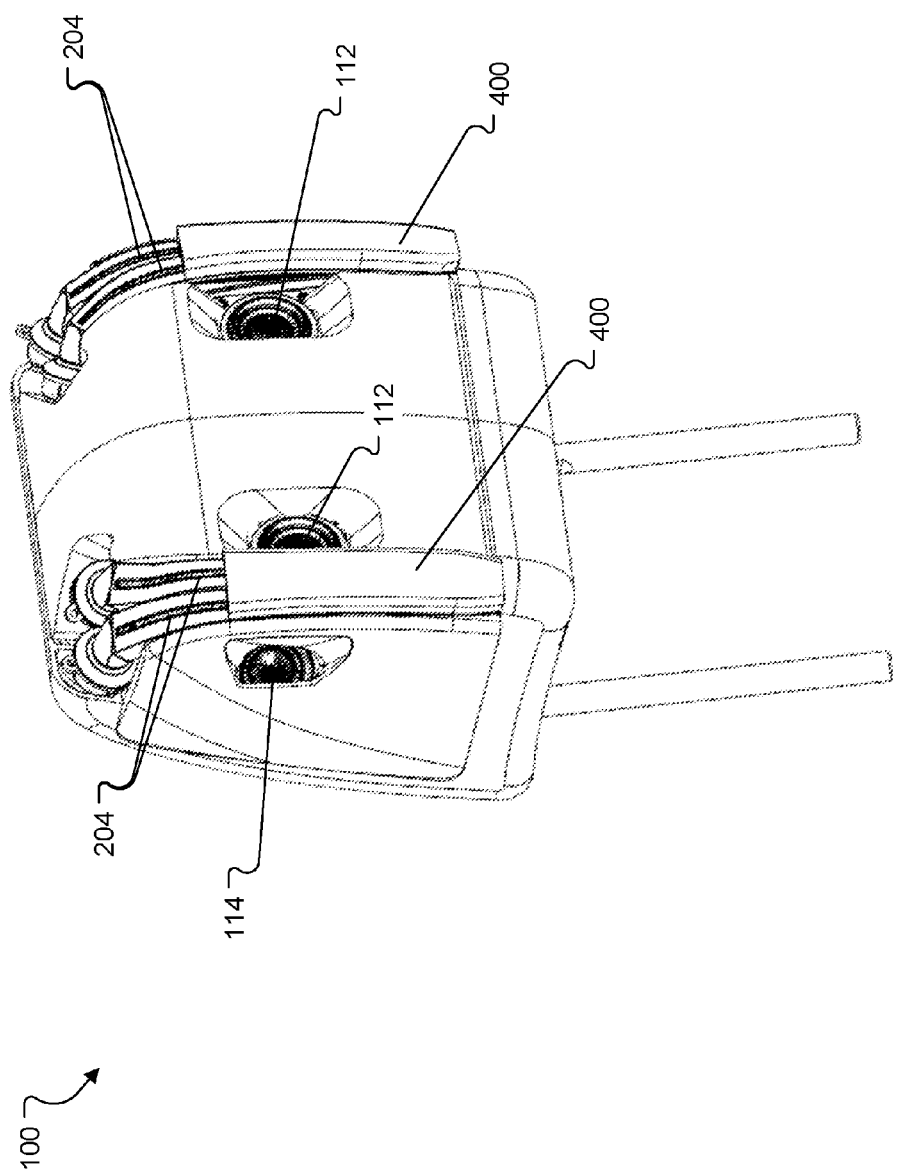
FIG. 4 is a perspective view of the vehicle headrest of FIG. 1A as seen from the front, top, and right side, shown with acoustically absorbent material disposed along passive directional acoustic devices of the headrest.

Referring to FIG. 3, each of the passive directional acoustic devices 110 includes a high frequency acoustic driver 300 (e.g., a tweeter), and a pipe 302 that is acoustically coupled to the high frequency acoustic driver 300. There is a lengthwise opening 304 along at least a portion of the length of the pipe through which acoustic energy is radiated to the environment. As shown in the figures, the opening 304 can include more than one section. An acoustically resistive material 204 (FIG. 2A) is placed in and/or over the lengthwise opening 304. The acoustically resistive material may be selected from wire mesh, sintered plastic, and/or fabric.

In operation, the combination of the lengthwise opening 304 and the acoustically resistive material 204 act as a large number of acoustic sources separated by small distance, and produces a directional radiation pattern. Acoustic energy is radiated into the pipe 302 by the associated high frequency acoustic driver 300 and radiates from the pipe 302 through the acoustically resistive material 204 as it proceeds along a length of the pipe 302. The cross-sectional area of the pipe 302 decreases with distance from the associated acoustic driver 300 such that the pressure is substantially constant along the length of the pipe 302. The substantially constant pressure magnitude results in a substantially uniform magnitude of the volume velocity along the pipe 302 and through the resistive material 204 and therefore more predictable directional characteristics.

The acoustic energy radiated into the pipe 302 exits the pipe through the acoustically resistive material 204, so that at the end 306 of the pipe 302, there is little acoustic energy in the pipe 302. Additionally, there is no reflective surface at the end 306 of the pipe 302. A result of these conditions is that the amplitude of standing waves that may form is less. A result of the lower amplitude standing waves is that the frequency response of the system is more regular than the frequency response of a system that supports standing waves. Additionally, the standing waves affect the directionality of the radiation, so control of directivity is improved.

One result of the lower amplitude standing waves is that the geometry, especially the length, of the pipe is less constrained than in a loudspeaker system that supports standing waves. For example, the length of the section of pipe from the acoustic driver 300 to the beginning of the slot 304 can be any convenient dimension. The respective lengths of the individual pipes need not be the same.

In the orientation shown in the figures, the passive directional acoustic devices 110 each individually provide the effect of a vertically arranged directional array. Each parallel pair of passive directional acoustic devices 110 is also arrayed to provide for a horizontal array for greater control (2-axis control) over the directional characteristics of the corresponding acoustic sub-assembly. Thus, a horizontal directional array and a vertical directional array can be provided using only two acoustic drivers.

Each of the acoustic sub-assemblies 108 also includes a pair of acoustic enclosures 308, 310 for supporting respective ones of the mid-high frequency acoustic drivers 112, 114. That is, each acoustic sub-assembly 108 includes one acoustic enclosure 308 for supporting one of the forward firing mid-high frequency drivers 112, and a second enclosure 308 for supporting one of the side firing mid-high frequency drivers 114.

In some cases, at least a portion of the pipes 302 and acoustic enclosures 308, 310 of each acoustic sub-assembly may be integrally formed. The pipes 302 and/or acoustic enclosures 308, 310 may be formed from metal or rigid plastic. In some cases, at least a portion of the pipes 302 is formed from a soft flexible material, such as silicone, which may be beneficial given the proximity of the pipes to the front, contact surface of the headrest. That is, a soft flexible material may be more comfortable than a hard material should a user's head contact the pipe 302.

Notably, the ends 312 of the pipes 302 to which the high frequency transducers 300 attached are curved inward, such that the high frequency transducers 300 are positioned inwardly toward the core 106 (FIG. 1A) and away from an outer surface of the headrest. This can further help to reduce the likelihood that a user's head will contact the acoustic drivers, thereby offering greater protection to the drivers and a potentially more comfortable configuration for the user.

The openings 304 are provided with a curvature that conforms to the curvature of the pipes 302, thereby allowing the passive directional acoustic devices to conform to the shape of the headrest 100.

A number of implementations have been described. Nevertheless, it will be understood that additional modifications may be made without departing from the scope of the inventive concepts described herein, and, accordingly, other implementations are within the scope of the following claims.

For example, in some implementations, to avoid unwanted energy from radiating downward from the front surface of the headrest, an acoustically absorbent material 400 (e.g., an acoustically absorbent foam) is applied over a portion of the opening near a distal end of the pipes 302. The acoustically absorbent material 400 provides something for the acoustic energy to dissipate into and reduces the amount of reflection back at the end of the pipe 302.

While implementations have been described which include a pair of arrayed passive directional acoustic devices, in some cases more or fewer passive directional acoustic devices may be arranged on each side of the headrest. For example, some implementations may include one passive directional acoustic device on each side of the headrest (e.g., one passive directional acoustic device per each acoustic sub-assembly).

In some implementations, the passive directional acoustic devices may be replaced with high frequency drivers (i.e., without the pipes). Further implementations do not include the high frequency acoustic drivers, but still provide the mid-high frequency drivers for arraying.

Furthermore, although an implementation of a detachably mounted headrest was described above, a fixed headrest seat (i.e., in which the headrest is integral with the seat back) is also contemplated.

In addition, while implementations have been described in which the acoustic sub-assemblies are mirror images of each other, in other implementations the acoustic sub-assemblies may take on slightly unique (asymmetric) features depending on if the sub-assembly is near the window or the center/inside of the vehicle.

What is claimed is:

1. A vehicle headrest comprising:
   a first acoustic sub-assembly comprising a first passive directional acoustic device and a second passive directional acoustic device,
   the first passive directional acoustic device comprising:
   a first acoustic driver; and
   a first pipe acoustically coupled to the first acoustic driver and comprising an elongated opening along at least a portion of the length of the first pipe through which acoustic energy is radiated to the environment, the radiation characterized by a volume velocity, the first pipe and the opening configured so that the magnitude of the volume velocity is substantially constant along the length of the first pipe; and the second passive directional acoustic device comprising:
   a second acoustic driver; and
   a second pipe acoustically coupled to the second acoustic driver and comprising an elongated opening along at least a portion of the length of the second pipe through which acoustic energy is radiated to the environment, the radiation characterized by a volume velocity, the second pipe and the opening configured so that the magnitude of the volume velocity is substantially constant along the length of the second pipe, wherein the second pipe is substantially parallel with the first pipe for arraying acoustic output of the first and second pipes.

2. The vehicle headrest of claim 1, a support rod for coupling the headrest to a seatback, wherein the first passive directional acoustic device is coupled to the support rod.

3. The vehicle headrest of claim 1, wherein the second passive directional acoustic device is directly coupled to the first passive directional acoustic device.

4. The vehicle headrest of claim 1, wherein the first acoustic sub assembly further comprises a third acoustic driver and a first acoustic enclosure for supporting the third acoustic driver.

5. The vehicle headrest of claim 4, wherein the first and second acoustic drivers are high frequency drivers, and the third acoustic driver is a mid-high frequency driver.

6. The vehicle headrest of claim 4, wherein the first pipe, the second pipe, and the first acoustic enclosure are at least partially integrally formed.

7. The vehicle headrest of claim 4, wherein the first acoustic sub assembly further comprises a fourth acoustic driver and a second acoustic enclosure for supporting the fourth acoustic driver, wherein the third acoustic driver and the fourth acoustic driver are configured to be driven in an acoustic array.

8. The vehicle headrest of claim 7, wherein the first and second acoustic drivers are high frequency drivers, and the third and fourth acoustic drivers are mid-high frequency drivers.

9. The vehicle headrest of claim 7, wherein the first pipe, the second pipe, the first acoustic enclosure, and the second acoustic enclosure are at least partially integrally formed.

10. The vehicle headrest of claim 1, further comprising a second acoustic sub-assembly that is a mirror image of the first acoustic sub-assembly.

11. The vehicle headrest of claim 1, wherein the first pipe is curved such that the first acoustic driver is positioned inwardly toward a core and away from an outer surface of the headrest.

12. The vehicle headrest of claim 1, wherein a portion of the first elongated opening is covered with an acoustic absorbing material.

13. The vehicle headrest of claim 1, wherein the first pipe is configured such that the magnitude of the pressure along the first pipe is substantially constant.

14. The vehicle headrest of claim 13, wherein the cross-sectional area of the first pipe decreases with distance from the first acoustic driver.

15. The vehicle headrest of claim 1, further comprising acoustically resistive material in or on the first opening.

16. The vehicle headrest of claim 15, wherein the resistance of the acoustically resistive material varies along the length of the first pipe.

17. The vehicle headrest of claim 15, wherein the acoustically resistive material is selected from the group consisting of: wire mesh, sintered plastic, fabric, and combinations thereof.

18. The vehicle headrest of claim 15, wherein the first pipe and the first opening are configured and dimensioned and the resistance of the resistive material is selected so that substantially all of the acoustic energy radiated by the acoustic driver is radiated through the first opening before the acoustic energy reaches the end of the first pipe.

19. The vehicle headrest of claim 1, wherein the first opening has more than one section.

20. The vehicle headrest of claim 1, wherein the first opening is curved and is on a curved surface of the first pipe.

21. A vehicle headrest comprising:
   a first acoustic sub-assembly comprising:
      a pair of passive directional acoustic devices, each of the passive directional acoustic devices comprising:
         a high frequency acoustic driver; and
         a pipe acoustically coupled to the high frequency acoustic driver and comprising an elongated opening along at least a portion of the length of the pipe through which acoustic energy is radiated to the environment, the radiation characterized by a volume velocity, the pipe and the opening configured so that the magnitude of the volume velocity is substantially constant along the length of the pipe;
      a pair of mid-high frequency drivers; and
      a pair of acoustic enclosures supporting respective ones of the mid-high frequency drivers.

22. The vehicle headrest of claim 21, further comprising a second acoustic sub-assembly, wherein the first and second acoustic sub-assemblies are substantially mirror images of each other.

23. The vehicle headrest of claim 21, wherein the pipes are curved such that the high frequency acoustic drivers are positioned inwardly toward a core and away from an outer surface of the headrest.

24. The vehicle headrest of claim 23, wherein the openings have a curvature which conforms to a curvature of the pipes.

25. The vehicle headrest of claim 21, wherein respective portions of the openings are covered with an acoustic absorbing material.

26. The vehicle headrest of claim 21, further comprising acoustically resistive material in or on the elongated openings.

27. The vehicle headrest of claim 26, wherein the resistance of the acoustically resistive material varies along the length of the pipes.

28. The vehicle headrest of claim 26, wherein the acoustically resistive material is selected from the group consisting of: wire mesh, sintered plastic, fabric, and combinations thereof.

29. The vehicle headrest of claim 26, wherein the pipes and the openings are configured and dimensioned and the resistance of the resistive material is selected so that substantially all of the acoustic energy radiated by the acoustic drivers is radiated through the openings before the acoustic energy reaches the end of the corresponding one of the pipes.

30. The vehicle headrest of claim 26, further comprising a support rod for coupling the headrest to a seatback, wherein the passive directional acoustic devices are coupled to the support rod.

* * * * *